Figures 1, 2, 3:
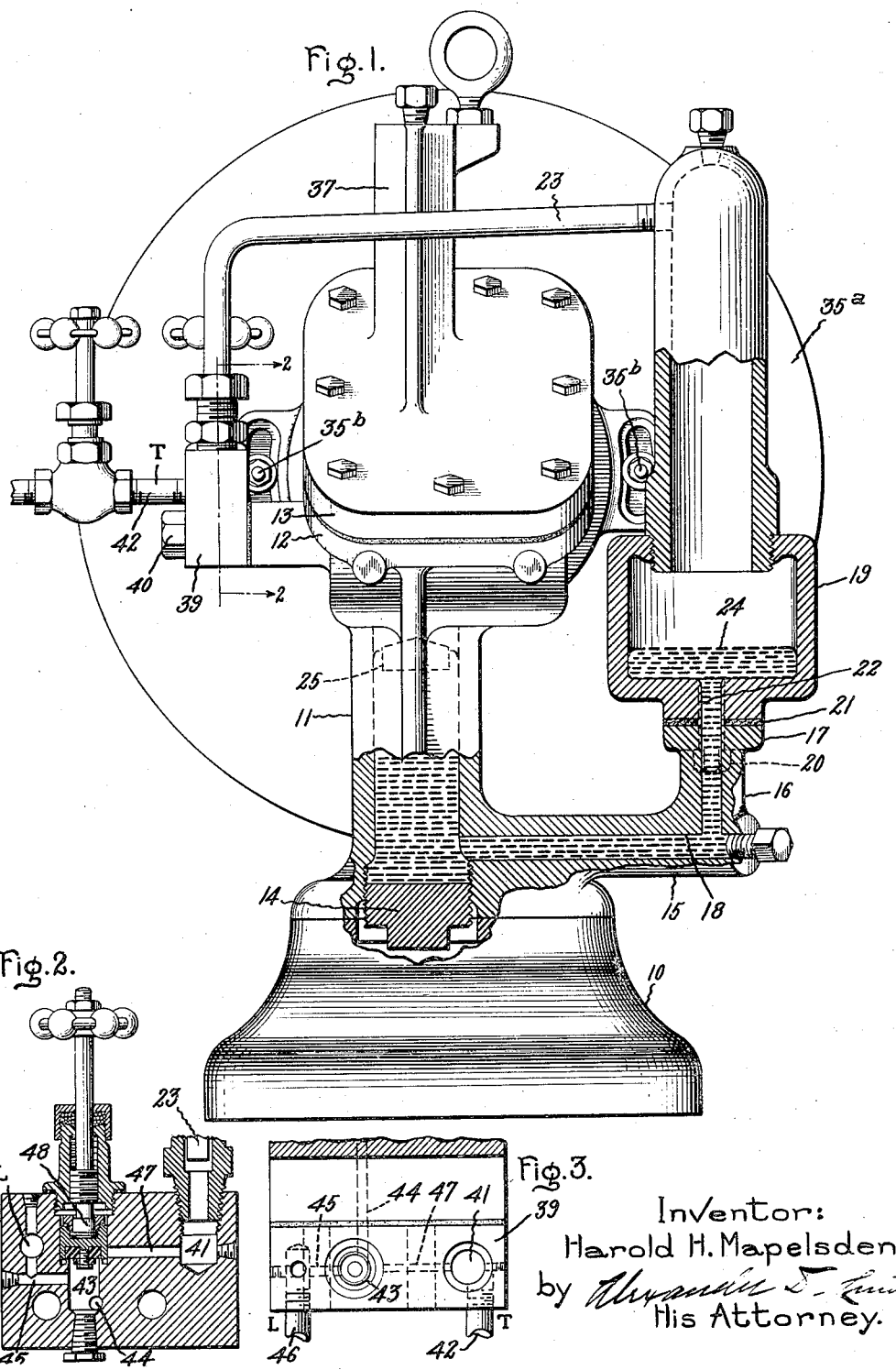

Jan. 29, 1924.  
H. H. MAPELSDEN  
FLOW METER AND THE LIKE  
Filed Oct. 25, 1922    2 Sheets-Sheet 1

1,481,921

Inventor:  
Harold H. Mapelsden,  
by  
His Attorney.

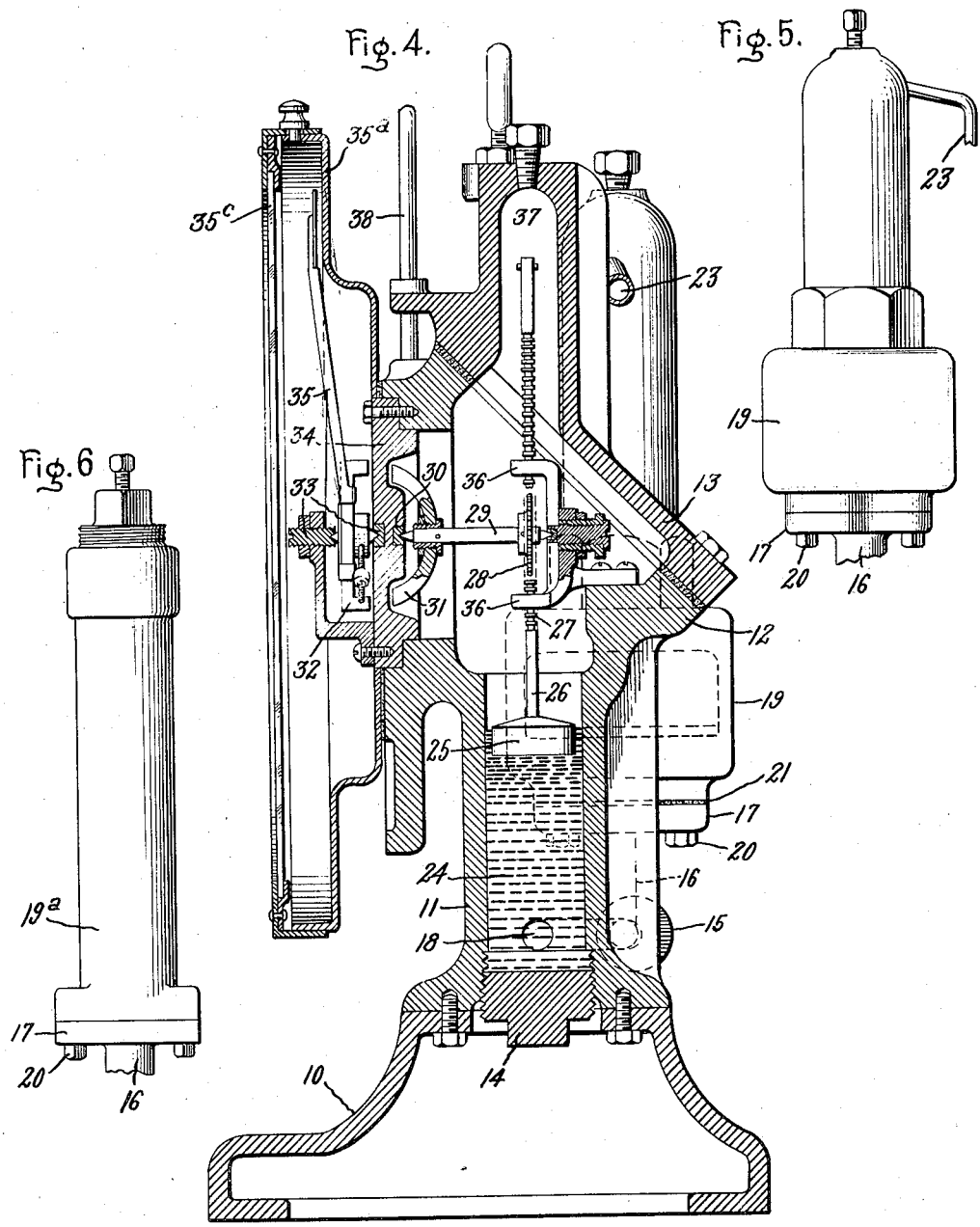

Patented Jan. 29, 1924.

1,481,921

UNITED STATES PATENT OFFICE.

HAROLD H. MAPELSDEN, OF SCHENECTADY, NEW YORK, ASSIGNOR TO GENERAL ELECTRIC COMPANY, A CORPORATION OF NEW YORK.

FLOW METER AND THE LIKE.

Application filed October 25, 1922. Serial No. 596,393.

*To all whom it may concern:*

Be it known that I, HAROLD H. MAPELSDEN, a citizen of the United States, residing at Schenectady, county of Schenectady, State of New York, have invented certain new and useful Improvements in Flow Meters and the like, of which the following is a specification.

The present invention relates to measuring instruments such as flow meters and the like which measure a pressure difference by the use of a U-tube containing a suitable indicating liquid. As is well understood, the differing pressures being applied to the two legs of the U-tube causes a deflection of the liquid proportional to the amount of pressure difference.

The amount of the deflection in the respective legs of a U-tube depends upon their relative cross sectional areas. If they have the same area, the deflection in each will be the same. That is, with a total deflection of the indicating liquid of one inch, the liquid in one leg will be lowered one-half inch and the liquid in the other leg will be raised one-half inch. On the other hand, if the area of one leg is twice that of the other, then with a total deflection of one inch, there will be a deflection of one-third inch in the larger leg and two thirds in the smaller leg. Thus it will be seen that by varying the relative areas of the two legs of a U-tube, any percentage of the total deflection may be placed in one leg. Usually it is not total deflection which is measured but the deflection in one leg only and under these circumstances the pressure difference represented by a certain deflection in one leg of a U-tube depends upon both the amount of the deflection and the relative areas of the two legs of the U-tube. It follows, therefore, that by varying the relative area of the two legs of a U-tube, the instrument may be adapted for different pressure difference ranges.

The object of my invention is to provide an improved U-tube structure for use in flow meters and the like in which the relative areas of the two legs of the U-tube can be easily changed so as to adapt the U-tube structure for use with various pressure difference ranges and for a consideration of what I believe to be novel and my invention, attention is directed to the accompanying description and the claims appended thereto.

In the drawing, Fig. 1 is a rear view partly in section, of an indicating instrument or U-tube, embodying my invention; Fig. 2 is a detail sectional view taken on line 2—2 Fig. 1; Fig. 3 is a top plan view of the block shown in section in Fig. 2 and the adjacent portion of the housing; Fig. 4 is a transverse sectional view; and Figs. 5 and 6 are views of U-tube legs adapted for use in my instrument.

Referring to the drawing, 10 indicates a base upon which is mounted a tube 11, the upper end of which is enlarged to form a housing 12 having an open top closed by a cover plate 13. The lower end of tube 11 is closed by a plug 14. Formed integral with tube 11 adjacent its lower end is an arm 15 which projects beyond the confines of housing 12 and is provided with an upturned end 16 on which is a flat bolting flange 17. In arm 15 is a passage 18 which communicates with tube 11. Fastened to flange 17 on arm 15 is a tube 19 which forms the other leg of the U-tube. It is fastened in position by bolts 20, a suitable packing 21 being provided to seal the joint. In the bottom of tube 19 is a passage 22 which communicates with passage 18 in arm 15. The two tubes 11 and 19 are thus in communication at their lower ends by way of passages 18 and 22. Tube 19 is closed at its upper end and connected to such end is a pressure pipe 23. In tubes 11 and 19 is a suitable indicating liquid 24.

For indicating the deflection of the liquid in tube 11 a float 25 is provided which rides on the liquid and is provided with a stem 26 having a rack portion 27 which meshes with a pinion 28. Pinion 28 is fixed on a shaft 29 mounted in suitable bearings 30. On the front end of shaft 29 is a permanent magnet 31 and opposite it outside the casing is a second permanent magnet 32 mounted to turn in bearings 33. The portion 34 of the housing wall between the magnets is made of non-magnetic material. The two magnets are thus magnetically coupled together so that magnet 32 will follow the movements of magnet 31. Connected to magnet 32 is a pointer 35 which moves over a suitable scale on a scale plate 35ª. Scale plate 35ª is fastened to housing 12 by bolts 35ᵇ, (Fig. 1) and forms a part of a housing closed by a glazed cover 35ᶜ. It will be understood that magnet 32 may actuate other mechanisms besides or in lieu of pointer 35, such as, for example, an integrating attachment or a recording attachment, the use of such devices being well known in this art. The mechanism shown is to be taken as typical of any suitable mechanism which it is desired to have operated by the float.

Stem 26 passes through guide arms 36 and its upper end is accommodated by a tubular projection 37 on cover plate 13. At 38 is a guide post for the cover plate.

On one side of housing 12 is a block 39 fastened by bolts 40. In block 39 is a recess 41 to which is connected pressure pipe 23 and also a pressure pipe 42 which extends to the source of pressure difference to be measured. In block 39 is a second recess 43 connected by a passage 44 to the interior of housing 12 and by a passage 45 to a pressure pipe 46 which extends to the source of pressure difference to be measured. For example, in the case of a flow meter, pressure pipes 42 and 46 extend to the two sides of a pressure difference creating device which creates a pressure difference which bears a definite relation to the rate of flow. Recesses 41 and 43 are connected by a cross passage 47 which is normally closed by a valve 48. When valve 48 is opened pressure pipes 42 and 46 are connected together thus short-circuiting the U-tube and permitting the indicating liquid to go to zero. This is useful in setting the U-tube for zero.

In use, the U-tube is filled with indicating fluid to such a level that with the same pressure in the two legs of the U-tube, the indicating pointer stands at zero on the scale. The pressure pipes 42 and 46 are connected to the source of differential pressure. Either pipe may be connected to the point of higher pressure depending upon the arrangement of the instrument. In the present instance it is intended that pipe 46 be connected to the higher pressure or leading pressure and pipe 42 to the lower pressure or trailing pressure. With this arrangement when a pressure difference occurs the level of the indicating liquid in tube 11 will be lowered and that in tube 19 raised. Float 25 will move downward with the level of the liquid in tube 11 thereby turning shaft 29 and magnet 31 through the intermediary of rack 27 and pinion 28. Magnet 32 will follow the movements of magnet 31 thus moving pointer 35 to indicate the amount of the deflection of the indicating liquid in tube 11. In the case of a flow meter, as is well understood, the pressure difference set up by the pressure difference creating device bears a definite relation to the rate of flow of the fluid being metered and hence pointer 35 will indicate rate of flow of fluid being metered in any suitable terms.

As to its mode of operation, this instrument is similar to others of this general type as used in flow meters and the like and as is clear, the portion of the deflection of the indicating liquid which is measured is that which occurs in tube 11 and the amount of this portion of the deflection is proportional to the respective areas of tubes 11 and 19. It is often desirable to adapt the same instrument for use with different pressure difference ranges which can be best done by changing the relative areas of the two legs of the U-tube. With my improved instrument this is accomplished by changing the leg 19. To do this it is only necessary to take out bolts 20, remove tube 19 and substitute in place of it another tube of greater or lesser cross sectional area as desired. This can be done without disturbing the moving parts of the mechanism which are contained in housing 12.

This arrangement is important from a manufacturing standpoint since an entire line of instruments adapted for different pressure ranges can be manufactured which differ from each other only in the dimensions of the U-tube leg 19. For example, a line of instruments may comprise the tube 11 and its associated mechanism and two or more tubes 19 of various sizes each of which is adapted to be connected with tube 11 and its associated mechanism to make a complete instrument. In Fig. 5, 19 indicates the detachable U-tube of Figs. 1 and 2, and in Fig. 6, 19ª indicates another leg of a different size which may be substituted for it.

It will be noted that in my instrument all the mechanism actuated by float 25 is associated directly with U-tube leg 11 and is not disturbed by changing U-tube leg 19.

In accordance with the provisions of the patent statutes, I have described the principle of operation of my invention, together with the apparatus which I now consider to represent the best embodiment thereof, but I desire to have it understood that the apparatus shown is only illustrative and the invention may be carried out by other means.

What I claim as new and desire to secure by Letters Patent of the United States is,—

1. In a pressure-responsive instrument for use with flow-meters and the like, the combination of a base, a tube mounted vertically thereon, an enlarged casing integral with the tube at its upper end forming a housing, flow meter mechanism in said housing, an arm extending from a point on the tube adjacent its lower end, said arm being hollow and upturned at its outer end to provide a seat, and a second tube detachably connected to said seat and communicating with said first-named tube through the hollow arm, said tubes and hollow connecting arm forming a U-tube.

2. In a pressure-responsive instrument for use with flow-meters and the like, the combination of a base, a seat on the base, a tube mounted on the seat, said tube having an enlarged upper end forming a housing, a movable rod in the housing, a float in the tube connected with the rod, a liquid in the tube on which the float rests, an arm extending from the tube adjacent its lower end, said arm having an upturned end provided with a seat, a second tube detachably mounted on the seat, the arm having a passage therein connecting the tubes whereby liquid from the first-named tube fills the passage and assumes a level in the second-named tube, providing a U-tube.

3. In a pressure-responsive instrument for use with flow meters and the like, the combination of a base, a tube mounted on said base, said tube having an enlarged upper end forming a housing, an arm extending from the tube adjacent to its lower end, said arm having a surface at its free end which presents a seat, a second tube detachably connected to said seat and extending parallel to the first-named tube, said arm having a passage connecting said tubes to form a U-tube, and indicating mechanism associated entirely with said first-named tube and said housing, whereby said second-named tube may be replaced without disturbing the indicating mechanism.

In witness whereof I have hereunto set my hand this 24th day of October, 1922.

HAROLD H. MAPELSDEN.